Sept. 12, 1967  P. MAUCHER  3,340,973
VEHICLE CLUTCH WITH DISC SPRING OPERATOR
Filed Feb. 17, 1965  4 Sheets-Sheet 4

Inventor:
Paul Maucher
By

United States Patent Office 3,340,973
Patented Sept. 12, 1967

3,340,973
VEHICLE CLUTCH WITH DISC SPRING OPERATOR
Paul Maucher, Stuttgart-Gablenberg, Germany, assignor to Luk Lamellen und Kupplungsbau G.m.b.H., Esslingen-Mettingen, Germany
Filed Feb. 17, 1965, Ser. No. 433,521
Claims priority, application Germany, Feb. 18, 1964, L 47,072
7 Claims. (Cl. 192—68)

The present invention relates to a clutch, especially for motor vehicles, in which a flywheel is mounted on the crankshaft and in which a pressing plate is connected to said flywheel while at least one clutch disc is connected with the output shaft. The clutch furthermore comprises a Belleville-type spring and a spring acting on the pressing plate.

In order to obtain a compact construction, it is known in connection with motor vehicles, to combine the motor, crankcase and transmission in one housing. With such an arrangement the clutch disc is expediently arranged between the driving or flywheel mounted on the crankshaft and the motor transmission unit.

With heretofore known arrangements of the type involved, the clutch disc is provided with a lining one side of which is adapted to engage a machined surface on the flywheel whereas the other side of said lining is adapted to be engaged by a pressing plate through the intervention of a relatively complicated and expensive basket-shaped member which surrounds the flywheel and is urged toward said last mentioned lining by means of a spring arranged in axial direction between flywheel and basket. Such a construction requires that for purposes of disengaging the clutch, the pressing plate together with the large basket has to be moved axially whereby the guiding and actuating elements are subjected to a considerable stress.

It is, therefore, an object of the present invention to provide a clutch, especially for motor vehicles, which will overcome the above-mentioned drawbacks.

It is another object of this invention to provide a clutch, especially for motor vehicles, which will be simple in construction and easy to install.

It is still another object of this invention to provide a clutch of the above-mentioned type in which the guiding and actuating elements will be subjected to low stresses only.

These and other objects and advantages of the invention will appear more clearly from the following specification in connection with the accompanying drawings, in which.

Figure 5:
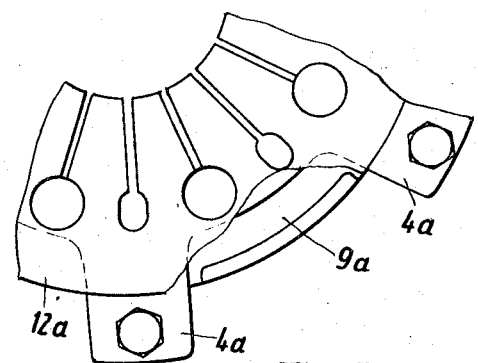
Figure 6:
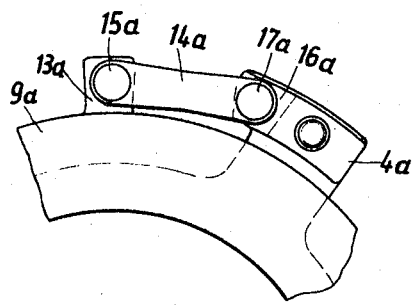
Figure 4:
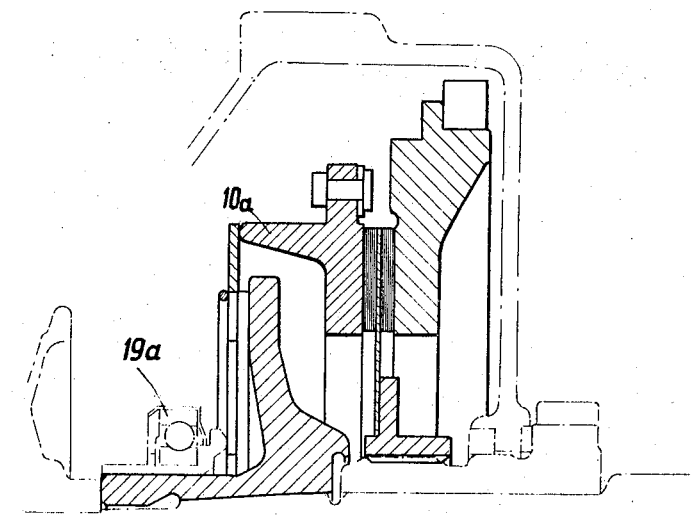
Figure 4:
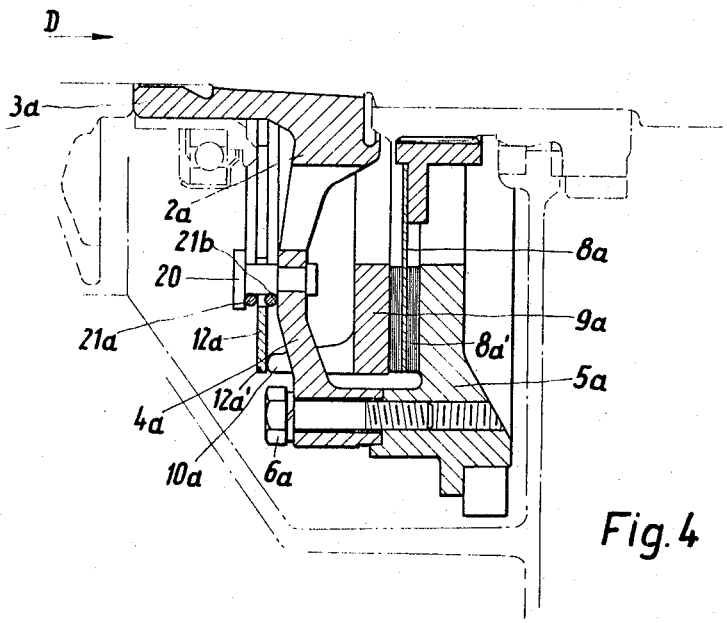

FIGS. 4 to 6 respectively illustrate in section and in partial view another embodiment of a clutch according to the present invention.

The clutch according to the present invention is characterized primarily in that the flywheel is designed in the form of a hub with radial arms between which extends the pressing plate for the support of the Belleville spring.

According to an advantageous embodiment of the invention, the outer ends of the radial arms of the flywheel have connected thereto a flywheel mass on which, in a manner known per se, there may be arranged teeth, for instance for the starter. This flywheel mass may in conformity with a further development of the invention simultaneously serve as surface to be engaged by the clutch disc.

According to still another development of the present invention, the pressing plate may be connected to radial arms of the flywheel by means of dogs and leaf springs, in which instance the radial arms of the flywheel may be provided with dogs having one end of the leaf springs connected thereto. Instead of leaf springs, follower cams of the pressure plate may engage corresponding recesses of the flywheel for guiding and turning the pressure plate.

The centering of the Belleville spring is effected in a simple manner according to a further feature of the invention by providing a holding ring connected to the flywheel and by its axially extending portion surrounding and centering the outer marginal area of the Belleville spring, a radial portion of the holding ring forming the counter-bearing for the Belleville spring.

According to still another feature of the invention, the Belleville spring may by means of bolts and rotatable supporting rings be connected directly to the arms of the flywheel.

Figure 1:
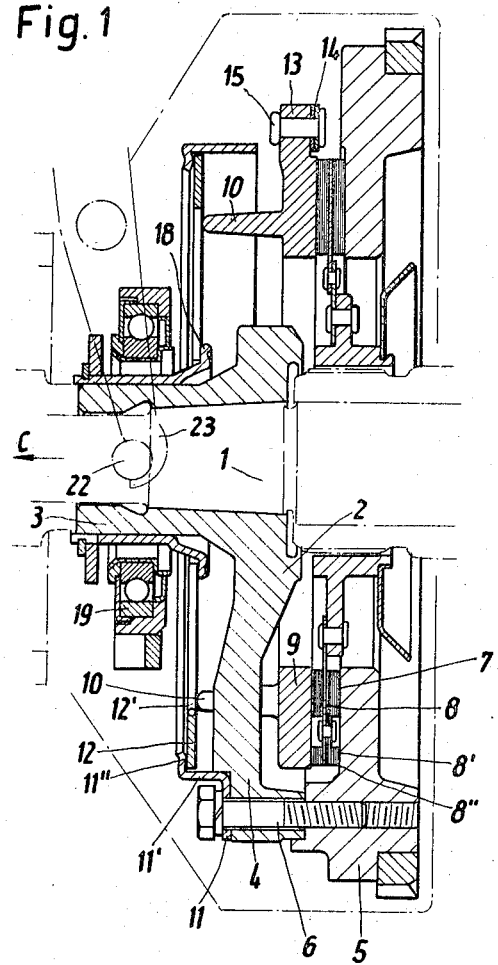
FIG. 1 is an axial section through a clutch according to the present invention, said section being taken along the line I—I of FIG. 2.
Figure 2:
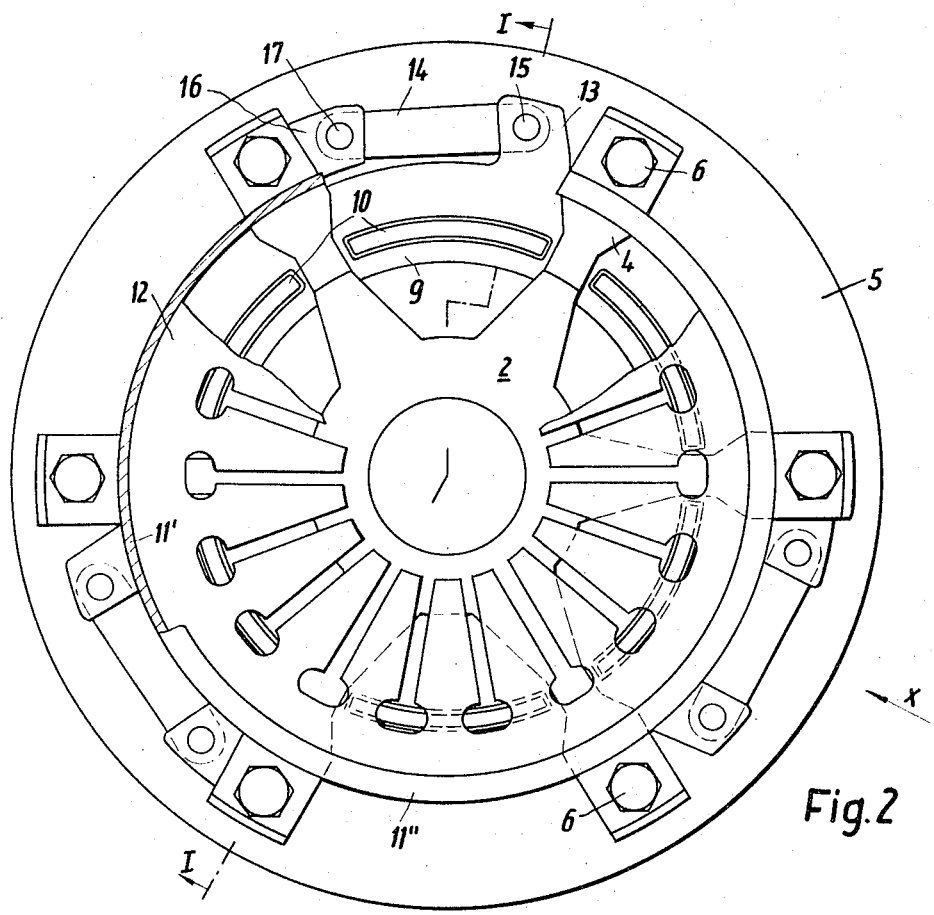
FIG. 2 is an end view of the clutch of FIG. 1 with parts broken away.
Figure 3:
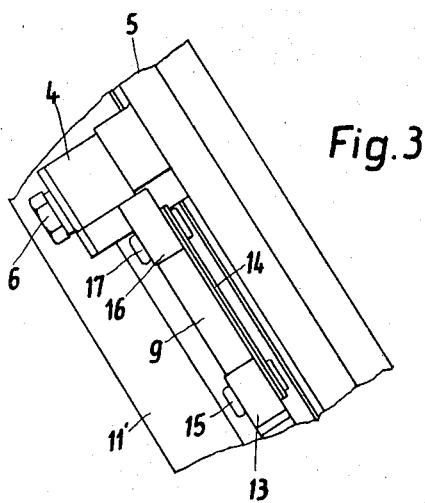
FIG. 3 is a partial view of FIG. 2 as seen in the direction of the arrow X of FIG. 2.

Referring now to the drawings in detail and FIGS. 1 to 3 thereof in particular, the arrangement shown therein comprises a flywheel 2 mounted on a crankshaft 1 and provided with a hub 3 which has radial arms 4. A flywheel mass 5 is by means of screws 6 connected to said arms 4. Flywheel mass 5 has a machined surface 7 adapted to be engaged by the lining 8' of a clutch disc 8, whereas the lining 8" on the other side of clutch disc 8 is adapted to be engaged by a pressing plate 9. Pressing plate 9 is provided with extensions or dogs 10 between which the radial arms 4 of flywheel 2 extend. These arms 4 have a holding ring 11, for instance of sheet metal, connected thereto, for instance by screws 6. The purpose of holding ring 11 consists in centering a dish spring 12, for instance of the Belleville type, by means of the axially extending cylindrical portion 11'. The radial flange portion 11" of holding ring 11 serves as support for dish spring 12. Dish spring 12, the outer marginal portion of which engages holding ring 11, has its inner area 12' resting on dogs 10 of pressing plate 9 and is adapted to press the pressing plate 9 against the lining 8" of clutch disc 8 which by means of its lining 8' will then be pressed against surface 7 of flywheel mass 5.

Pressing plate 9 is provided with extensions or dogs 13 preferably extending somewhat radially outwardly. Connected to said extensions 13, for instance by rivets 15, are leaf springs 14 which have their other end, for instance by rivets 17, connected to extensions or dogs 16 of supporting arms 4 of flywheel 2. Said leaf springs 14 serve as connecting elements or entraining means.

The clutch is actuated through the intervention of a bushing 18. To this end, the disengaging bearing 19 is moved in the direction of the arrow C, and dish spring 12 will at its inner diameter likewise be moved in the direction of the arrow C. As a result thereof, the area 12' of dish spring 12 is moved in the direction C so that pressing plate 9 will be relieved. Consequently, pressing plate 9 is lifted off from clutch disc 8, and the clutch is disengaged.

According to the embodiment illustrated in FIGS. 4 to 6, flywheel 2a is likewise provided with a hub 3a having radial arms 4a between which axially extends a pressing plate 9a. A flywheel mass 5a is by means of screws 6a connected to the outer ends of radial arms 4a of flywheel 2a. Flywheel mass 5a simultaneously serves as engaging surface for clutch disc 8a and, more specifically, its lining 8a'. Dish spring 12a is by means of bolts 20 and engaging rings 21a and 21b connected to arms 4a of flywheel 2a and has its outer marginal area 12' resting on extensions 10a of pressing plate 9a. For purposes of actuating the clutch, the disengaging bearing 19a is moved in axial direction as indicated by the arrow D. During the engaging and disengaging operation of the clutch, dish spring 12a rolls on wire rings 21a and 21b which are circularly arranged around bolts 20. In this way, the outer marginal area 12a' of dish spring 12a is lifted off from extensions 10a of pressing plate 9a and moves away therefrom whereby said extensions are relieved.

FIG. 5 shows a portion of dish spring 12a and of pressing plate 9a therebelow which is guided in axial direction and extends between arms 4a of flywheel 2a. FIG. 6 illustrates that the pressure plate is by means of extensions or dogs connected to leaf springs at the radial arms of the flywheel.

It is, of course, to be understood that the present invention is, by no means, limited to the particular constructions shown in the drawings but also comprises any modifications within the scope of the appended claims.

It may be added that bearings 19, 19a may be axially reciprocated in any convenient manner, for instance by a pin and lever arrangement 22, 23 indicated in dot-dash lines.

What I claim is:

1. A clutch structure, especially for motor vehicles, which includes: a flywheel, said flywheel having an outer annular portion, and a hub and radial arm means interconnecting said hub and said annular portion, said annular portion having annular surface means with the plane thereof substantially perpendicular to the axis of rotation of said flywheel, friction disc means adapted to be rotatably connected to a driven shaft and operable selectively to frictionally engage and disengage said annular surface means to thereby selectively establish and interrupt frictional driving connection between said flywheel and said friction disc means, driving shaft means connected to said hub, pressing plate means interposed between a portion of said radial arm means and said friction disc means and operable selectively to press said friction disc means against said annular surface means and to permit said friction disc means to frictionally disengage said annular surface means, said pressing plate means being provided with extension means extending between and beyond said radial arm means, said dish spring means normally engaging said extension means so as to cause said plate means to press said friction disc means against said annular surface means, said dish spring means also being operable selectively to disengage said extension means to thereby relieve pressure on said plate means and said friction disc means.

2. A clutch structure according to claim 1, in which said pressing plate means is guided in axial direction of said flywheel.

3. A clutch structure according to claim 1, in which said pressing plate means is also provided with radial extension means extending beyond the outer periphery of said friction disc means, and a plurality of means respectively connecting said radial extension means with said radial arm means.

4. A clutch structure according to claim 3, in which said means respectively connecting said radial extension means with said radial arm means are formed by leaf spring means.

5. A clutch structure according to claim 4, in which the outer peripheral portions of said radial arm means are provided with extension means respectively connected to one end of said leaf spring means.

6. A clutch structure according to claim 1, which includes annular holding means connected to said radial arm means and comprising a first annular section extending in axial direction of said flywheel for centering said dish spring means and also comprising a second section extending in radial direction of said annular holding means for engagement with an outer marginal portion of said dish spring means.

7. A clutch structure according to claim 1, which includes connecting means connecting said dish spring means to said radial arm means, said connecting means including bolt means and ring means extending around said bolt means and common thereto and being located on opposite sides of said dish spring means.

References Cited
UNITED STATES PATENTS

| | | | |
|---|---|---|---|
| 2,256,714 | 9/1941 | Hunt | 192—68 |
| 2,485,214 | 10/1949 | Peterson et al. | 192—68 |
| 2,770,341 | 11/1956 | Wobrock | 192—89 X |
| 2,835,366 | 5/1958 | Haussermann | 192—89 X |
| 3,118,526 | 1/1964 | Wolfram | 192—68 |
| 3,130,828 | 4/1964 | Maurice | 192—89 X |

BENJAMIN W. WYCHE, III, *Primary Examiner.*